United States Patent
Kurokawa et al.

(10) Patent No.: US 11,318,980 B2
(45) Date of Patent: May 3, 2022

(54) STEERING SECTION FOR STEER-BY-WIRE SYSTEM

(71) Applicant: NSK LTD., Tokyo (JP)

(72) Inventors: Yoshifumi Kurokawa, Gunma (JP); Yuichiro Taguchi, Gunma (JP)

(73) Assignee: NSK, LTD., Tokyo (JP)

( * ) Notice: Subject to any disclaimer, the term of this patent is extended or adjusted under 35 U.S.C. 154(b) by 0 days.

(21) Appl. No.: 17/286,225

(22) PCT Filed: Oct. 16, 2019

(86) PCT No.: PCT/JP2019/040751
§ 371 (c)(1),
(2) Date: Apr. 16, 2021

(87) PCT Pub. No.: WO2020/080436
PCT Pub. Date: Apr. 23, 2020

(65) Prior Publication Data
US 2021/0339788 A1    Nov. 4, 2021

(30) Foreign Application Priority Data

Oct. 19, 2018   (JP) .............................. JP2018-197227

(51) Int. Cl.
*B62D 1/10* (2006.01)
*B62D 1/06* (2006.01)
*B62D 1/08* (2006.01)

(52) U.S. Cl.
CPC ................. *B62D 1/10* (2013.01); *B62D 1/06* (2013.01); *B62D 1/08* (2013.01)

(58) Field of Classification Search
CPC .................................... B62D 1/10; B62D 1/08
See application file for complete search history.

(56) References Cited

U.S. PATENT DOCUMENTS

2010/0175499 A1\* 7/2010 Thomas .............. B60R 21/2032
74/552
2017/0313341 A1   11/2017 Hoggarth et al.
2018/0037248 A1   2/2018 Schwart et al.

FOREIGN PATENT DOCUMENTS

JP    U61-049124    4/1986
JP    2000061854    2/2000
(Continued)

OTHER PUBLICATIONS

International Search Report, (English) International Application No. PCT/JP2019/040751, dated Dec. 24, 2019, (2-pages).
(Continued)

*Primary Examiner* — Vicky A Johnson
(74) *Attorney, Agent, or Firm* — Hartman Global IP Law; Gary M. Hartman; Domenica N. S. Hartman

(57) ABSTRACT

A steering section of a steer-by-wire system includes a handle having a center axis of rotation arranged in the front-rear direction, and a handle-support shaft having a center axis arranged in the front-rear direction and that is supported so as not to be able to rotate about the center axis with respect to the vehicle. The handle is rotatably supported so as to be able to rotate about the center axis of rotation with respect to the rear-end portion of the handle-support shaft. The center axis of the handle-support shaft is arranged so as to be offset upward with respect to the center axis of rotation of the handle.

12 Claims, 18 Drawing Sheets

(56) References Cited

FOREIGN PATENT DOCUMENTS

| | | |
|---|---|---|
| JP | 2004268754 | 9/2004 |
| JP | 2006256453 | 9/2006 |

OTHER PUBLICATIONS

PCT International Search Report (Japanese) Application No. PCT/JP2019/040751, dated Dec. 24, 2019, (9-pages).

\* cited by examiner (a)

(b)

US 11,318,980 B2

STEERING SECTION FOR STEER-BY-WIRE SYSTEM

CROSS REFERENCE TO RELATED APPLICATIONS

This application claims the benefit of PCT/JP2019/040751 filed Oct. 16, 2019, having a priority claim to Japanese Patent Application No. 2018-197227 filed Oct. 19, 2018. The contents of these prior patent documents are incorporated herein by reference.

TECHNICAL FIELD

The present invention relates to a steering section of a steer-by-wire system installed in a vehicle such as automobile.

BACKGROUND ART

A steer-by-wire system that is installed in an automobile includes a steering section having a handle that is steered by a driver, and a turning section having an actuator for applying a steering angle to a pair of steered wheels; with the steering section and the turning section being electrically coupled. In a steer-by-wire system, the amount of operation of the handle is detected by a sensor, and a steering angle is applied to a pair of steered wheels by driving an actuator of the turning section based on an output signal from the sensor (for example, refer to JP 2004-268754A and JP 2006-256453A).

As illustrated in FIG. 18, the steering section of a conventional steer-by-wire system includes a handle 1 that is operated by a driver, a handle-support shaft 2 that supports and fixes the handle 1 to a rear-end portion thereof, and a tubular housing (column) 3 that rotatably supports the handle-support shaft 2 on the inside. The handle-support shaft 2 and the housing 3 are arranged so as to incline in a downward direction going in a direction toward the front. The handle 1, together with the handle-support shaft 2, rotates with respect to the housing 3. In other words, the center axis of rotation of the handle 1 and the center axis of the handle-support shaft 2 substantially coincide with each other.

CITATION LIST

Patent Literature

Patent Literature 1: JP 2004-268754A
Patent Literature 2: JP 2006-256453A

SUMMARY OF INVENTION

Technical Problem

The steering section of a conventional steer-by-wire system has a structure in which a handle 1 and a handle-support shaft 2 rotate together with respect to a housing 3, and thus the center axis of rotation of the handle 1 and the center axis of the handle-support shaft 2 substantially coincide with each other, and as a result the leg space for the driver in the driver's seat tends to be narrowed in the vertical direction due to the presence of the handle-support shaft 2 and housing 3. Therefore, from the aspect of increasing the leg space in the vertical direction for the driver in the driver's seat, there is room for improvement.

An object of the present invention is to achieve a structure that allows for maintaining a large amount of leg space in the vertical direction for the driver in the driver's seat.

Solution to Problem

The steering section of a steer-by-wire system of an aspect of the present invention includes a handle-support shaft and a handle.

The handle-support shaft has a center axis arranged in a direction having a component in a front-rear direction and is supported so as not to be able to rotate about the center axis with respect to a vehicle.

The handle has a center axis of rotation arranged in a direction having a component in the front-rear direction and is supported so as to be able to rotate about the center axis of rotation with respect to a rear-end portion of the handle-support shaft.

The center axis of the handle-support shaft is arranged so as to be offset upward with respect to the center axis of rotation of the handle.

The center axis of rotation of the handle may be arranged in a downward direction going toward the front. In this case, a distance between the center axis of the handle-support shaft and the center axis of rotation of the handle in a vertical direction may increase going toward the front. Alternatively, the center axis of the handle-support shaft and the center axis of rotation of the handle may be parallel to each other.

The handle-support shaft may include a fixed-side guide that is fixed to the rear-end portion of the handle-support shaft, and the handle may include a rotating-side guide. The handle may be supported with respect to the rear-end portion of the handle-support shaft by the rotating-side guide being rotatably supported with respect to the fixed-side guide.

The rotating-side guide may have a shape extending in a circumferential direction about the center axis of rotation of the handle. In this case, by the rotating-side guide being supported so as to be able to freely move in the circumferential direction with respect to the fixed-side guide, the rotating-side guide is rotatably supported with respect to the fixed-side guide.

The steering section of a steer-by-wire system according of an aspect of the present invention may also include a plurality of rollers that are rotatably supported by the fixed-side guide and arranged on an outer-diameter side and an inner-diameter side of the rotating-side guide. In this case, by the plurality of rollers performing rolling guidance of the rotating-side guide, the rotating-side guide is supported so as to be able to freely move in the circumferential direction with respect to the fixed-side guide.

The rollers may be arranged at a plurality of positions in a direction of the center axis of rotation of the handle on at least any of the outer-diameter side and the inner-diameter side of the rotating-side guide.

In the steering section of a steer-by-wire system of an aspect of the present invention, the rotating-side guide may be positioned in the direction of the center axis of rotation of the handle with respect to the fixed-side guide by the rotating-side guide and at least one of the plurality of rollers engaging with each other in the direction of the center axis of rotation of the handle.

More specifically, the rotating-side guide includes a circumferential groove formed in the circumferential direction on a circumferential surface of the rotating-side guide, and the rotating-side guide may be positioned in the direction of the center axis of rotation of the handle with respect to the fixed-side guide by the circumferential groove and the at least one roller engaging with each other in the direction of the center axis of rotation of the handle.

Alternatively, the rotating-side guide includes a circumferential projection formed in the circumferential direction on a circumferential surface of the rotating-side guide, and the rotating-side guide may be positioned in the direction of the center axis of rotation of the handle with respect to the fixed-side guide by the circumferential projection and the at least one roller engaging with each other in the direction of the center axis of rotation of the handle.

Effect of Invention

With the steering section of a steer-by-wire system of an aspect of the present invention, it is possible to maintain large leg space in the vertical direction for the driver in the driver's seat.

DESCRIPTION OF EMBODIMENTS

First Example

A first example of an embodiment of the present invention will be described using FIGS. 1 to 8. Note that, in the following description, with respect to a steer-by-wire system, the front-rear direction, the width direction, and the vertical direction refer to the front-rear direction, the width direction, and the vertical direction of the vehicle body in which the steer-by-wire system is installed.

Figure 1:
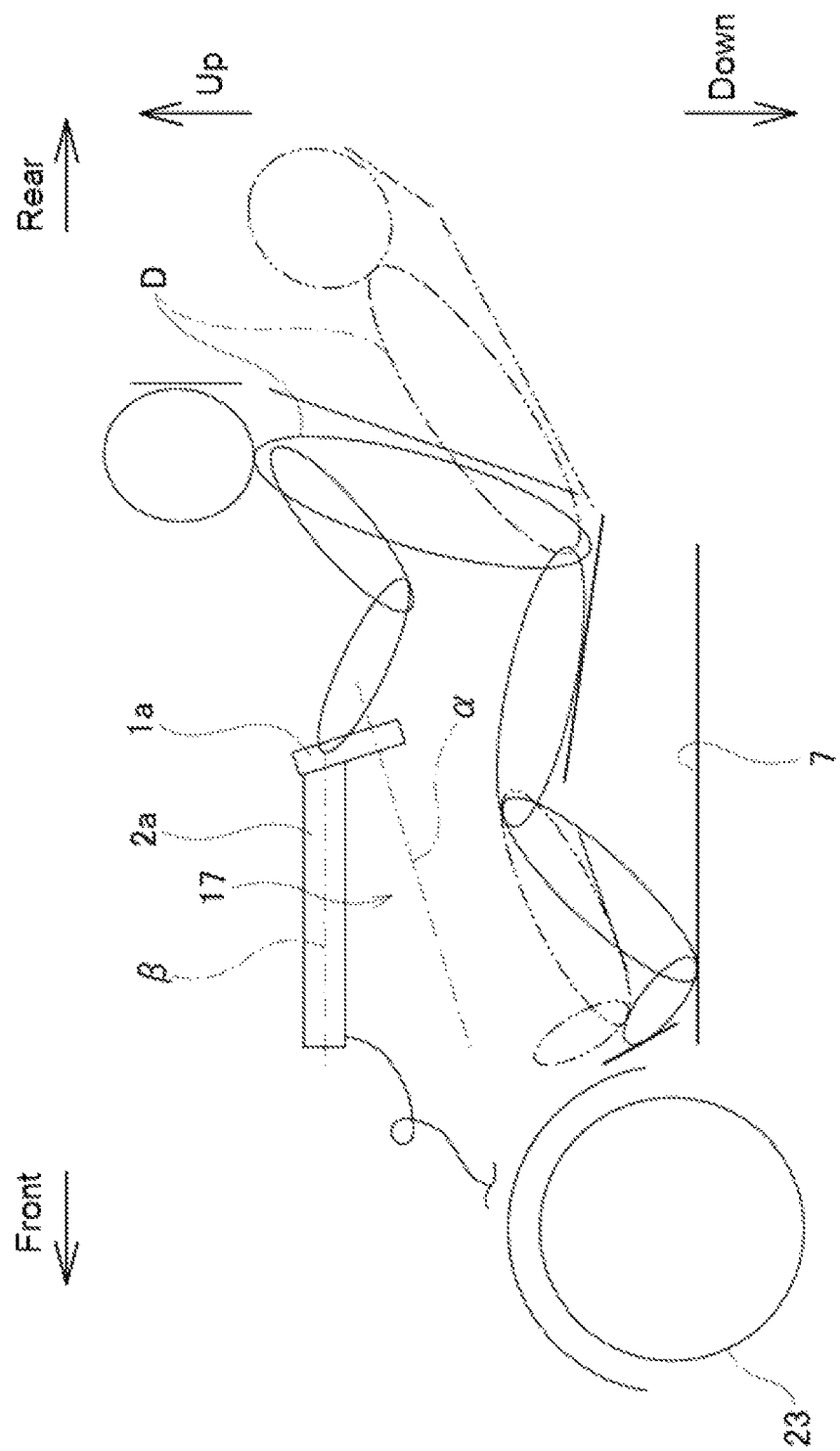
FIG. 1 is a side view that schematically illustrates the driver's seat and surrounding area in a vehicle in which a steering section of a steer-by-wire system is installed according to a first example of an embodiment of the present invention.
Figure 2:
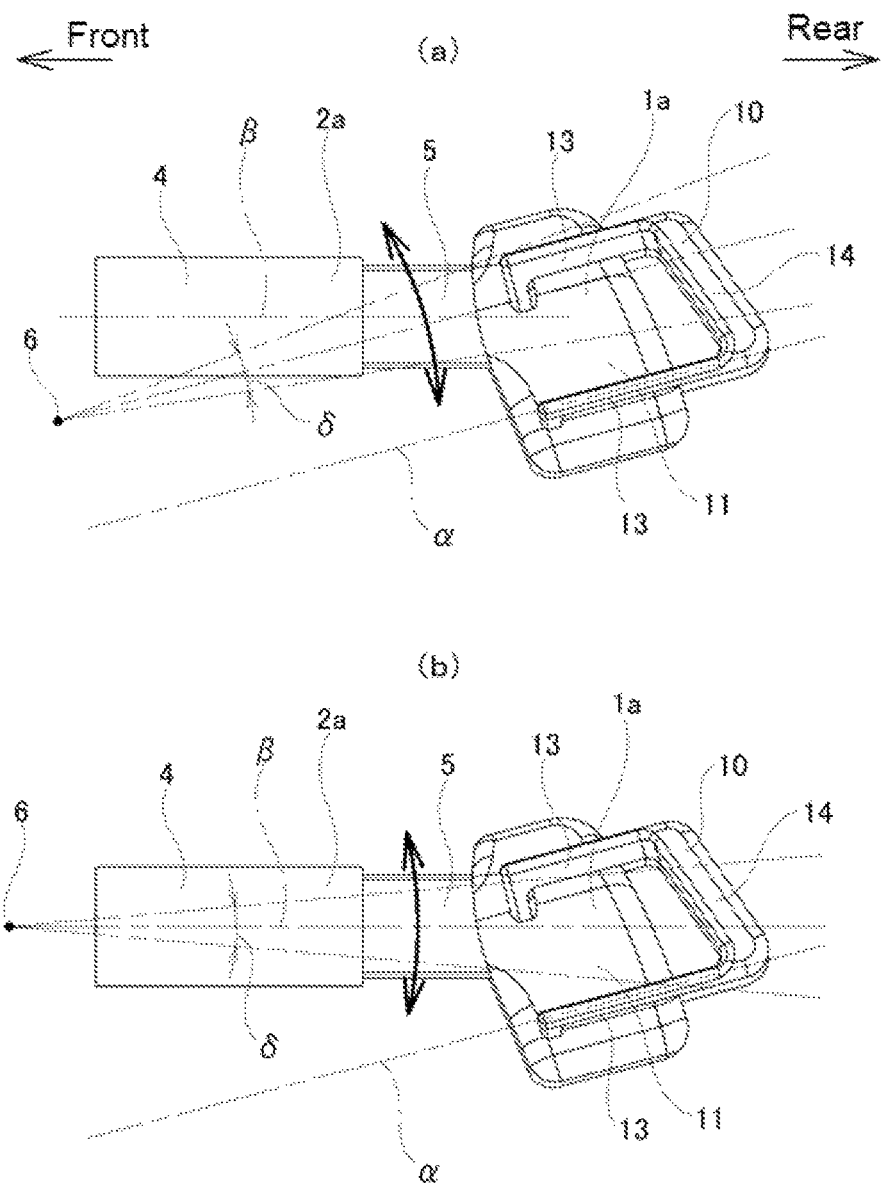
FIG. 2A is a side view illustrating the steering section of the steer-by-wire system of the first example together with a tilt shaft for adjusting the height position of a handle.
FIG. 2B is a side view similar to FIG. 2A, and illustrates a modification of the first example.
Figure 3:
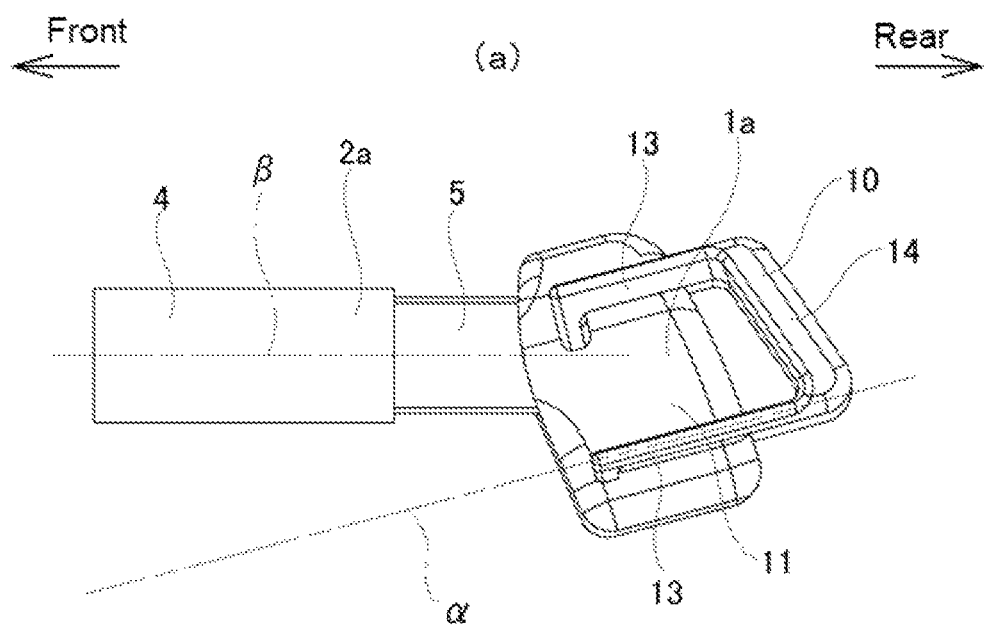
FIG. 3A is a side view illustrating the steering section of the steer-by-wire system of the first example in a state in which the front-rear position of the handle is adjusted to the rear-end position.
FIG. 3B is a side view illustrating the steering section in a state in which the handle is adjusted to the front-end position.
Figure 3:
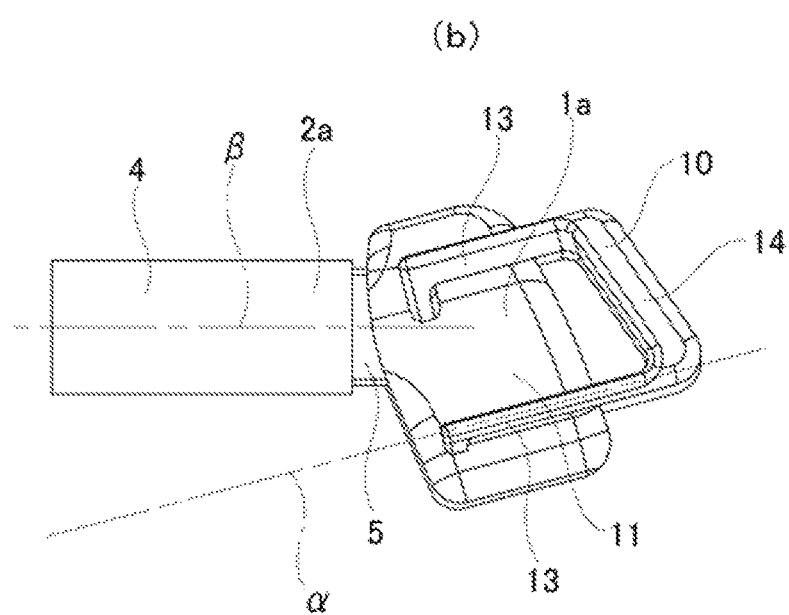
Figure 4:
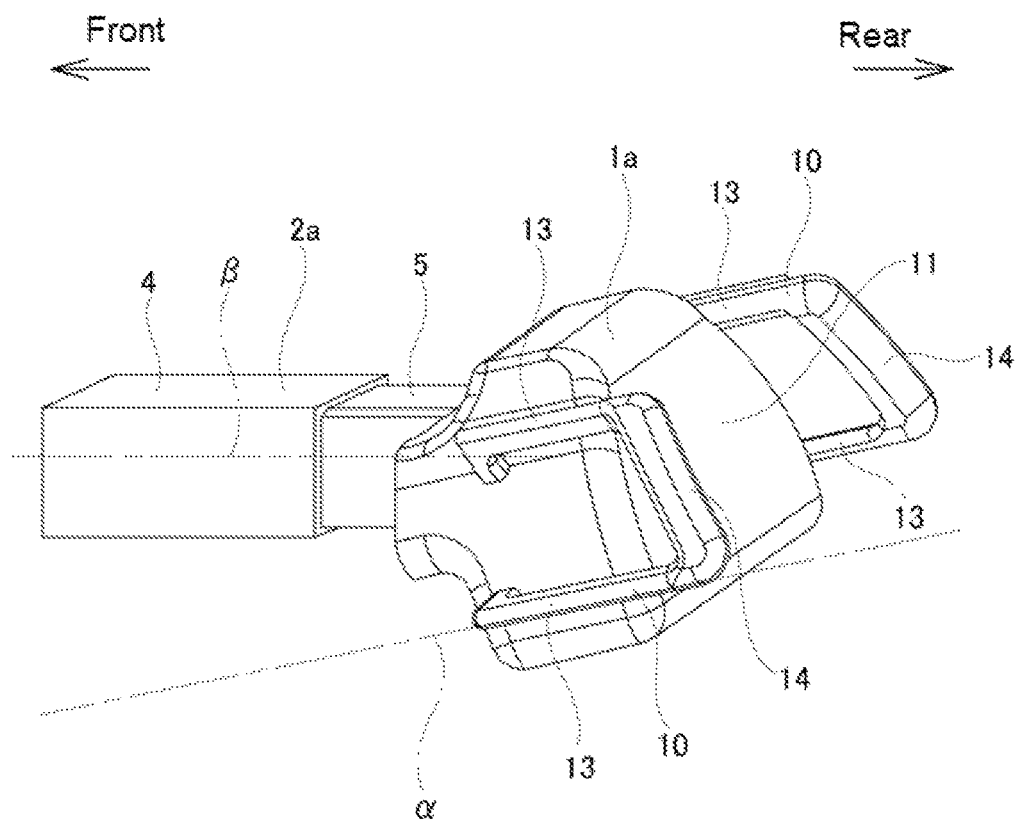
FIG. 4 is a perspective view illustrating the steering section of the steer-by-wire system of the first example.

As illustrated in FIG. 1, the steer-by-wire system of this example includes a steering section having a handle $1a$ that is operated by a driver D and a turning section (not illustrated) having an actuator for applying a steering angle to a pair of steered wheels 23, and the steering section and the turning section are electrically connected. In the steer-by-wire system of this example, the amount of operation of the handle $1a$ is detected by a sensor, and a steering angle is applied to the pair of steered wheels 23 by the actuator of the turning section being driven based on an output signal from the sensor.

The steering section of the steer-by-wire system of this example includes the handle $1a$ and a handle-support shaft $2a$.

Figure 18:
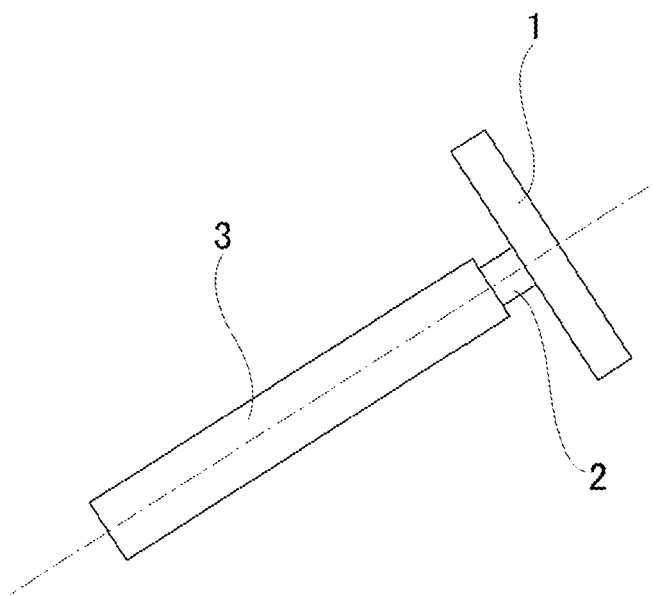
FIG. 18 is a side view that schematically illustrates an example of a conventional structure of a steering section of a steer-by-wire system.

The handle $1a$ is rotatably supported with respect to the rear-end portion of the handle-support shaft $2a$. The center axis of rotation $\alpha$ of the handle $1a$ is arranged in a downward direction going toward the front. The handle-support shaft $2a$ has a center axis $\beta$ arranged in the front-rear direction, and is supported so as not to be able to rotate about the center axis $\beta$ with respect to the vehicle. In other words, differing from the conventional structure illustrated in FIG. 18, in the steering section of the steer-by-wire system of this example, the handle-support shaft $2a$ does not rotate during use even in a case where the handle $1a$ is rotated by the operation of the driver D. Within a range in the front-rear direction where the steering section of the steer-by-wire system is present, the center axis $\beta$ of the handle-support shaft $2a$ is arranged so as to be offset upward with respect to the center axis of rotation $\alpha$ of the handle $1a$. In particular, in this example, the entire handle-support shaft $2a$ is arranged above the center axis of rotation $\alpha$ of the handle $1a$. Moreover, the center axis $\beta$ of the handle-support shaft $2a$ is arranged substantially horizontally. In other words, the center axis $\beta$ of the handle-support shaft $2a$ is arranged substantially parallel to the floor surface 7 of the vehicle interior, which is a horizontal plane. Therefore, the distance between the center axis $\beta$ of the handle-support shaft 2a and the center axis of rotation α of the handle 1a in the vertical direction increases going toward the front.

The handle-support shaft 2a includes a front-side shaft portion 4 arranged on the front side and a rear-side shaft portion 5 arranged on the rear side, and by coaxially combining the front-side shaft portion 4 and the rear-side shaft portion 5 such that relative displacement in the axial direction is possible, the handle-support shaft 2a is configured so as to be able to extend or collapse in the axial direction. In other words, the direction of the center axis β of the handle-support shaft 2a and the direction in which the front-side shaft portion 4 and the rear-side shaft portion 5 are relatively displaced when the handle-support shaft 2a is extended or collapsed coincide with each other. Each of the front-side shaft portion 4 and the rear-side shaft portion 5 has a tubular shape (a square tubular shape in the illustrated example). Note that in a case of implementing the present invention, the cross-sectional shapes of the front-side shaft portion and the rear-side shaft portion are not particularly limited. In other words, the front-side shaft portion and the rear-side shaft portion are not limited to being formed in the square tubular shape as in the illustrated example; and for example, may have a cylindrical shape, a polygonal tubular shape other than a square, a deformed tubular shape, or the like.

In this example, the rear-side shaft portion 5 is inserted into the inner-diameter side of the front-side shaft portion 4 so as to be able to slide in only the axial direction. The front-side shaft portion 4 is supported with respect to the vehicle body so as to be able to pivotally displace about a tilt shaft 6 arranged in the width direction. It is possible to perform adjustment of the height position of the handle 1a based on the pivotal displacement of the handle-support shaft 2a about the tilt shaft 6.

In this example, as illustrated in FIG. 2A, the tilt shaft 6 is arranged further forward than the handle-support shaft 2a and below the center axis β of the handle-support shaft 2a. More specifically, the tilt shaft 6 is arranged at a position between the center axis β of the handle-support shaft 2a and the center axis of rotation α of the handle 1a in the vertical direction. Therefore, when adjusting the height position of the handle 1a, the handle 1a moves in a direction substantially perpendicular to the center axis of rotation α as illustrated by the thick arrows in FIG. 2A, or in other words, in a direction predicted by the driver D. Therefore, it is possible to prevent the driver D from feeling uncomfortable when adjusting the height position of the handle 1a. However, the tilt shaft 6 may also be arranged at another position. For example, as illustrated in FIG. 2B, the tilt shaft 6 may be arranged further forward than the handle-support shaft 2a and at the same position in the vertical direction as the center axis β of the handle-support shaft 2a.

The range in which the height position of the handle 1a may be adjusted, or in other words, the range in which the handle-support shaft 2a may be pivotally displaced around the tilt shaft 6, is restricted to a specified range. This specified range is a range indicated by the central angle δ in both the configurations of FIGS. 2A and 2B. In this example, as illustrated, at the central position of the range, the center axis β of the handle-support shaft 2a is arranged horizontally. In other words, at the central position of the range, as shown in FIG. 1, the center axis β of the handle-support shaft 2a is arranged parallel to the floor surface 7 of the vehicle interior.

In this example, the operation of adjusting the height position of the handle 1a, or in other words, the operation of pivotally displacing the handle-support shaft 2a about the tilt shaft 6 is performed by a tilt electric actuator (not illustrated).

In this example, adjustment of the front-rear position of the handle 1a may be performed by extending or collapsing the handle-support shaft 2a, and more specifically, by displacement of the rear-side shaft portion 5 in the axial direction with respect to the front-side shaft portion 4.

The range in which it is possible to adjust the front-rear position of the handle 1a, or in other words, the range in which it is possible to displace the rear-side shaft portion 5 in the axial direction with respect to the front-side shaft portion 4 is limited to a specified range. FIG. 3A illustrates a case in which the handle 1a is positioned at the rearmost side in the specified range. Moreover, FIG. 3B illustrates a case in which the handle 1a is positioned at the frontmost side in the specified range. Note that it is also possible to adopt a configuration in which in a state where the handle 1a illustrated in FIG. 3B is positioned at the frontmost side, at least a part of the handle 1a is housed in a handle storage portion provided on the front side of the driver's seat.

In this example, the operation of adjusting the front-rear position of the handle 1a, or in other words, the operation of displacing the rear-side shaft portion 5 in the axial direction with respect to the front-side shaft portion 4 is performed by a telescopic electric actuator (not illustrated).

Next, a structure for rotatably supporting the handle 1a on the rear-end portion of the handle-support shaft 2a will be described.

Figure 5:
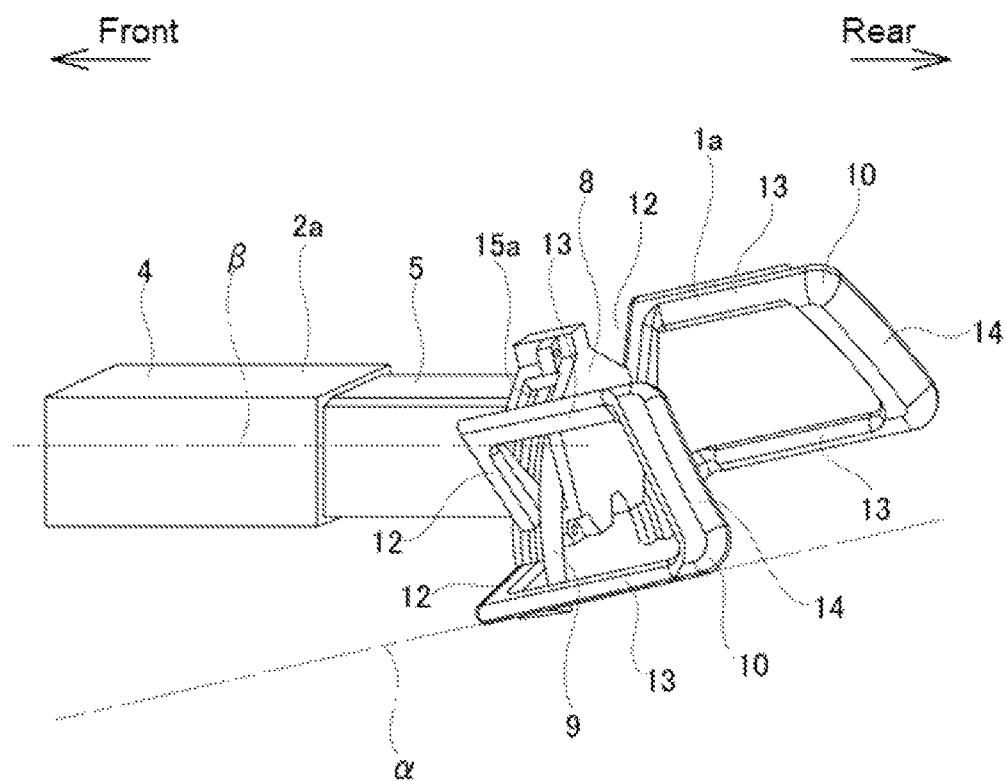
FIG. 5 is a view similar to FIG. 4 illustrating the handle and a handle-support shaft of the first example in a state in which a handle cover is removed.

In this example, as illustrated in FIG. 5, a fixed-side guide 8 is coupled and fixed to the rear-end portion of the rear-side shaft portion 5 that is the rear-end portion of the handle-support shaft 2a.

Figure 6:
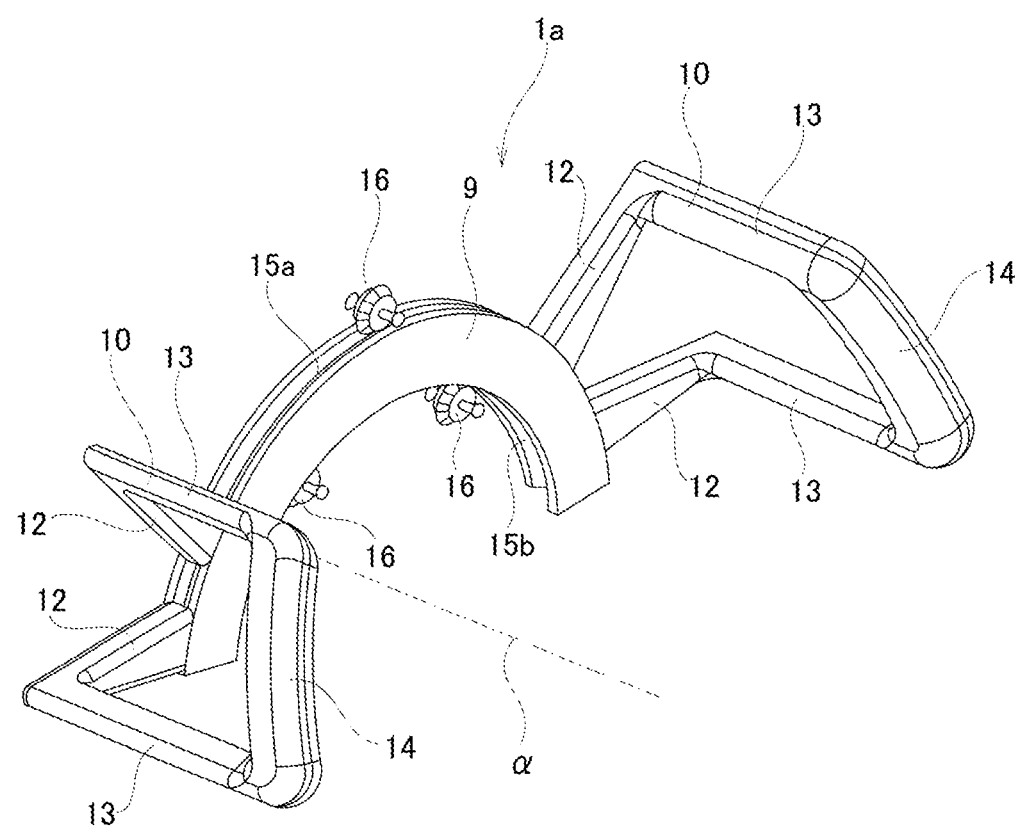
FIG. 6 is a perspective view illustrating the handle of the first example in a state in which the handle cover is removed.

The handle 1a includes a rotating-side guide 9, a pair of grips 10, and a handle cover 11. FIG. 5 and FIG. 6 illustrate a state in which the handle cover 11 is removed from the handle 1a.

Figure 7:
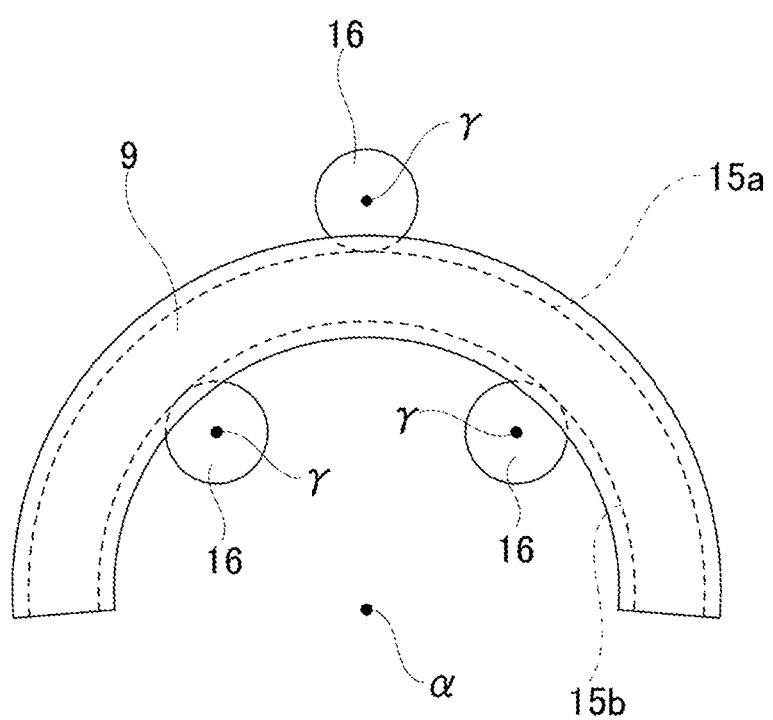
FIG. 7 is a schematic view illustrating a rotating-side guide and rollers of the handle of the first example as seen from the direction of the center axis of rotation of the handle.
Figure 8:
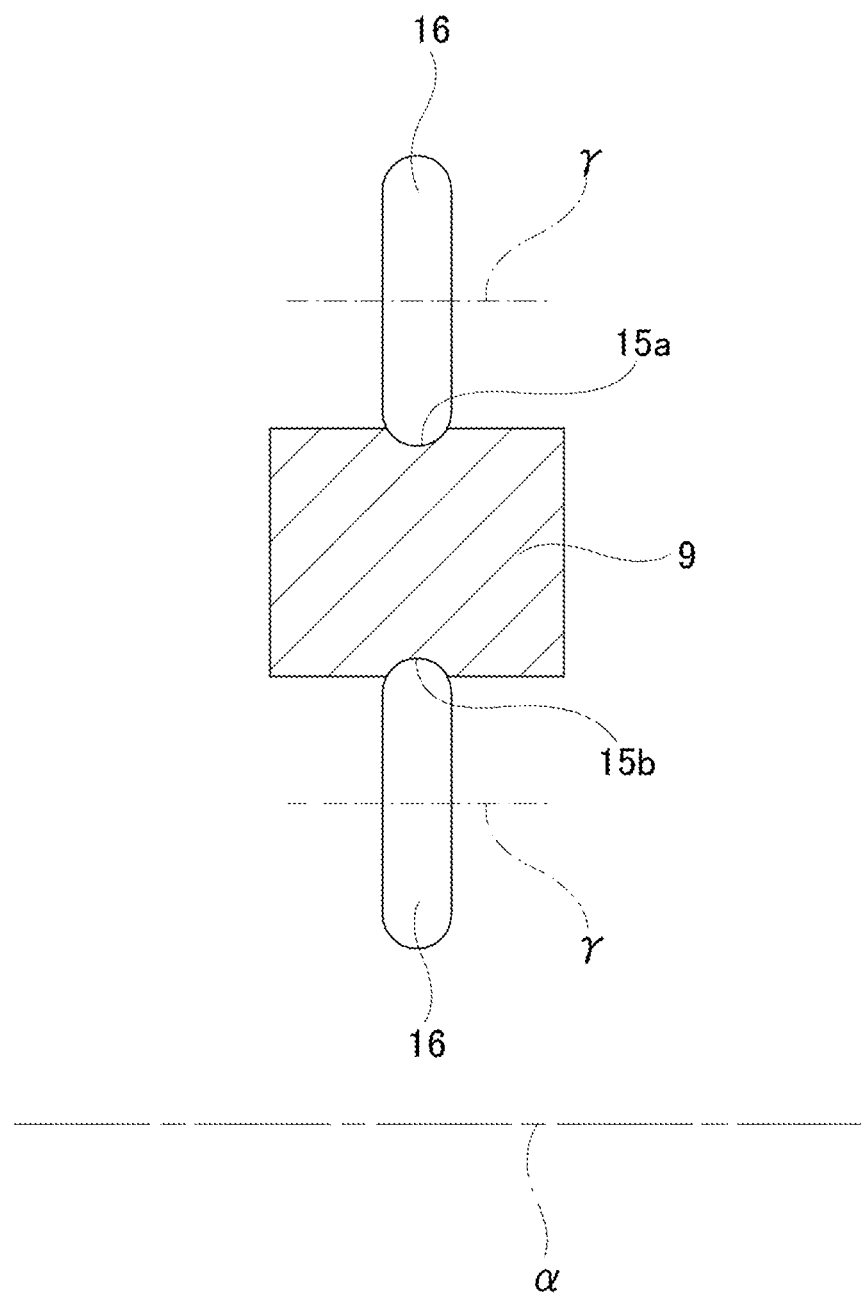
FIG. 8 is a schematic view illustrating a cross-section of the rotating-side guide and the rollers of the handle of the first example that is cut by a virtual plane that includes the center axis of rotation of the handle.

As illustrated in FIGS. 5 to 7, a rotating-side guide 9 has a shape that extends in the circumferential direction centered on the center axis of rotation α of the handle 1a, and more specifically, has a substantially semicircular shape. Moreover, in the steering position of the handle 1a when the vehicle is traveling straight as illustrated in FIGS. 2 to 7, the central portion in the circumferential direction of the rotating-side guide 9 is located at the upper-end portion. In other words, in the steering position of the handle 1a when the vehicle is traveling straight, the rotating-side guide 9 is positioned in a substantially upper half portion on the circumference centered on the center axis of rotation α. In this example, the handle 1a is supported with respect to the rear-end portion of the handle-support shaft 2a so as to freely rotate centered on the center axis of rotation α by freely supporting the rotating-side guide 9 of the handle 1a with respect to the fixed-side guide 8 coupled and fixed to the rear-end portion of the handle support shaft 2a so as to freely move in the circumferential direction. In a case of implementing the present invention, in addition to adopting an arc shape having an arbitrary central angle (arc shape with a central angle of less than 180 degrees, arc shape with a central angle of 180 degrees, arc shape with a central angle of more than 180 degrees) as the shape of the rotating-side guide, it is also possible to adopt a circular shape in which the entire circumference is connected. Moreover, in a case where the shape of the rotating-side guide has an arc shape, the central portion in the circumferential direction of the rotating-side guide may be positioned at the upper-end portion in the steering position of the handle 1a when the vehicle is traveling straight, as in this example. In this way, the rotating-side guide may be positioned as high as possible, so that the leg space 17 (FIG. 1) in the driver's seat may be increased by that amount.

The base-end portions of the pair of grips 10 are coupled and fixed to both end portions in the circumferential direction of the rotating-side guide 9. Each of the pair of grips 10 includes a pair of radial arm portions 12 that extend outward in the radial direction from both end portions in the circumferential direction of the rotating-side guide 9, a pair of axial arm portions 13 extending toward the rear in parallel with the center axis of rotation α from the outer end portions in the radial direction of the pair of radial arm portions 12, and a grip portion 14 that connects the rear-end portions of the pair of axial arm portions 13. The grip portions 14 of the pair of grips 10 are to be gripped when the driver D operates the handle 1a. Note that in a case of implementing the present invention, the shape of the grip portions of the handle may be an annular shape which is the same shape as in the case of a steering wheel of a general automobile.

The handle cover 11 has a substantially rectangular box shape and is attached to the rotating-side guide 9. In the installed state, the rotating-side guide 9, the pair of radial arm portions 12 of the pair of grips 10, and the fixed-side guide 8 that is coupled and fixed to the rear-end portion of the handle-support shaft 2a are housed inside the handle cover 11.

In this example, in order to support the rotating-side guide 9 of the handle 1a so as to be able to freely move in the circumferential direction with respect to the fixed-side guide 8 that is coupled and fixed to the rear-end portion of the handle-support shaft 2a, a plurality of rollers 16 are supported with respect to the fixed-side guide 8 so as only to be able to rotate freely. The center axis of rotation γ of each of the plurality of rollers 16 is parallel to the center axis of rotation α of the handle 1a. Moreover, the plurality of rollers 16 are arranged on both the outer-diameter side and the inner-diameter side of the rotating-side guide 9. The rotating-side guide 9 is supported with respect to the fixed-side guide 8 so as to be able to freely move in the circumferential direction by rolling guidance by the plurality of rollers 16.

In this example, one circumferential groove 15a, 15b is formed in the circumferential direction on each the outer-circumferential surface and the inner-circumferential surface of the rotating-side guide 9. The outer circumferential portions of the rollers 16 engage with each of these circumferential grooves 15a, 15b. As a result, the rotating-side guide 9 is positioned in the axial direction with respect to the fixed-side guide 8.

In this example, the roller 16 arranged on the outer-diameter side of the rotating-side guide 9 and the rollers 16 arranged on the inner-diameter side of the rotating-side guide 9 are out of positional phase with each other in the circumferential direction. In other words, the number of rollers 16 arranged on the outer-diameter side of the rotating-side guide 9 is one. As illustrated in FIG. 7, the roller 16 arranged on the outer-diameter side of the rotating-side guide 9 is arranged at a position in the circumferential direction corresponding to a position in the same width direction as the center axis of rotation α of the handle 1a. On the other hand, the number of rollers 16 arranged on the inner-diameter side of the rotating-side guide 9 is two. As illustrated in FIG. 7, each of the rollers 16 arranged on the inner-diameter side of the rotating-side guide 9 is arranged at a position in the circumferential direction that is shifted by the same distance on both sides in the width direction with respect to the center axis of rotation α of the handle 1a. Note that in a case of implementing the present invention, the number and phase in the circumferential direction of the rollers 16 arranged on the outer-diameter side of the rotating-side guide 9 and the rollers 16 arranged on the inner-diameter side of the rotating-side guide 9 may also be different from this example.

The steering section of the steer-by-wire system of this example may include a handle-operation-amount sensor (not illustrated) for detecting the operation amount (rotation angle in both directions with respect to a neutral position) of the handle 1a, a reaction-force-applying device (not illustrated) for applying an operating reaction force to the handle 1a, or the like. A force meter attached to the handle 1a may be adopted as the handle-operation-amount sensor. Moreover, a sensor that detects the operation amount of the handle 1a based on the rotation amount (rotation angle in both directions with respect to a neutral position) of the rotating-side guide 9 with respect to the fixed-side guide 8 may be adopted as the handle-operation-amount sensor. A magnetic rotation sensor that detects the rotation amount of the rotating-side guide 9 in a non-contact manner, a rotation sensor that detects the rotation amount of the rotating-side guide 9 after converting the rotation of the rotating-side guide 9 into the rotation of other rotating bodies such as the rollers 16, 16a, dedicated gears, or the like may be adopted as such a sensor.

In the steering section of the steer-by-wire system of this example, the center axis β of the handle-support shaft 2a is arranged so as to be shifted upward with respect to the center axis of rotation α of the handle 1a. Therefore, with the steering section of the steer-by-wire system of this example, compared with a structure such as in the conventional structure illustrated in FIG. 18 in which the center axis of the handle-support shaft 2 substantially coincides with the center axis of rotation of the handle 1, it is possible to maintain a large leg space 17 in the driver's seat in the vertical direction (FIG. 1). In particular, in this example, the entire handle-support shaft 2a is arranged above the center axis of rotation α of the handle 1a. Moreover, the center axis β of the handle-support shaft 2a is arranged substantially horizontally. In other words, the distance between the center axis β of the handle-support shaft 2a and the center axis of rotation α of the handle 1a in the vertical direction increases going toward the front. Therefore, the leg space 17 in the driver's seat may be kept sufficiently large in the vertical direction. Accordingly, the comfortability in the driver's seat may be improved.

Second Example

Figure 9:
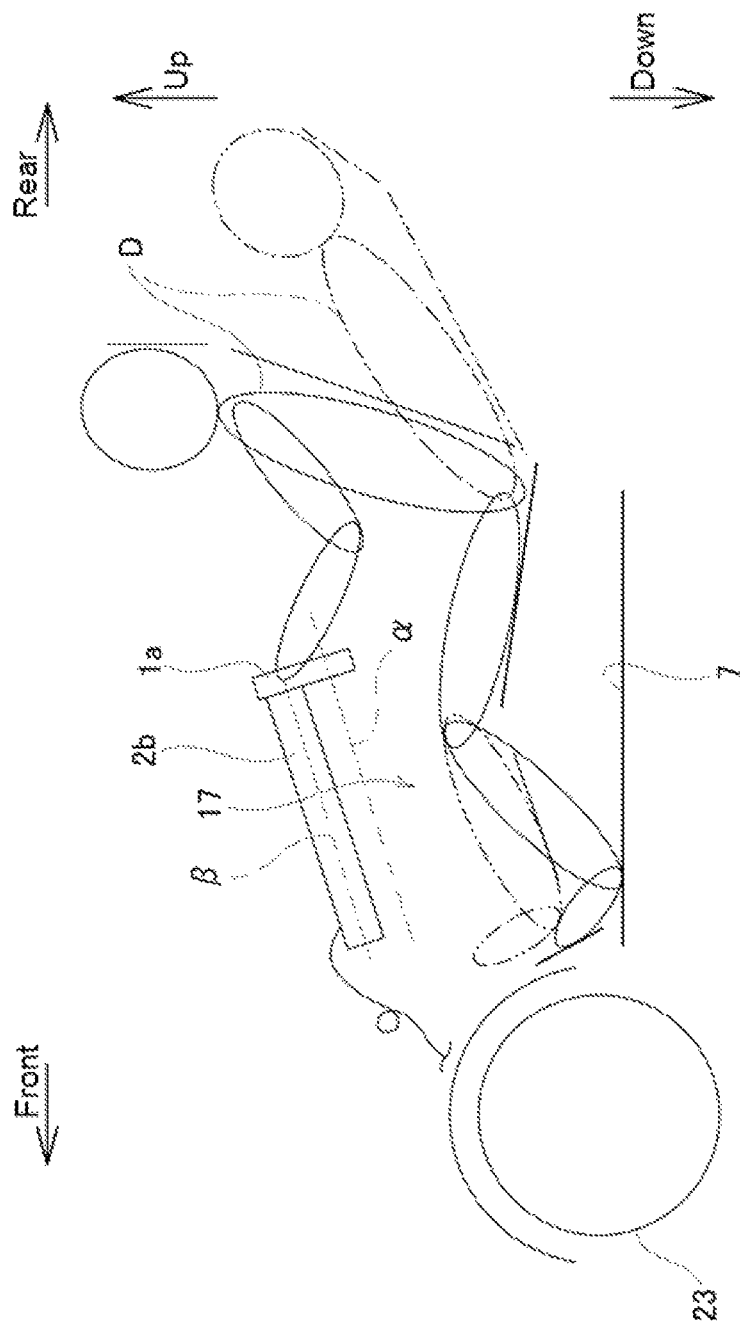
FIG. 9 is a view corresponding to FIG. 1 and illustrates a second example of an embodiment of the present invention.
Figure 10:
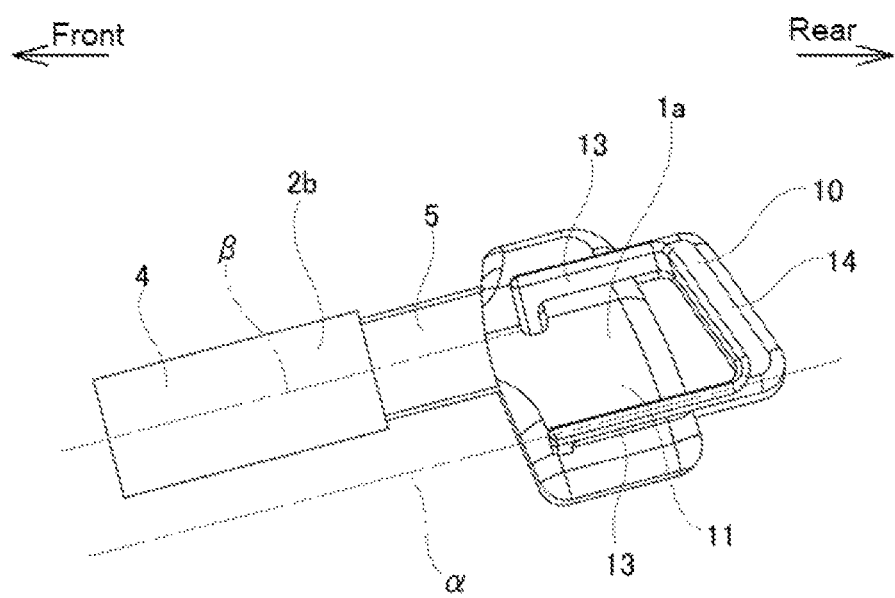
FIG. 10 is a side view illustrating a steering section of a steer-by-wire system according to the second example.

A second example of an embodiment of the present invention will be described using FIGS. 9 and 10. In this example, the posture of the handle-support shaft 2b is different from that in the first example. In other words, in this example, the center axis β of the handle-support shaft 2b is arranged parallel to the center axis of rotation α of the handle 1a. In the structure of this example, when adjusting the front-rear position of the handle 1a, the handle 1a moves in the direction of the center axis of rotation α of the handle 1a, or in other words, in the direction predicted by the driver D. Therefore, it is possible to sufficiently prevent the driver D from feeling uncomfortable when adjusting the front-rear position of the handle 1a. Other configurations and operations are the same as in the first example.

Third Example

Figure 11:
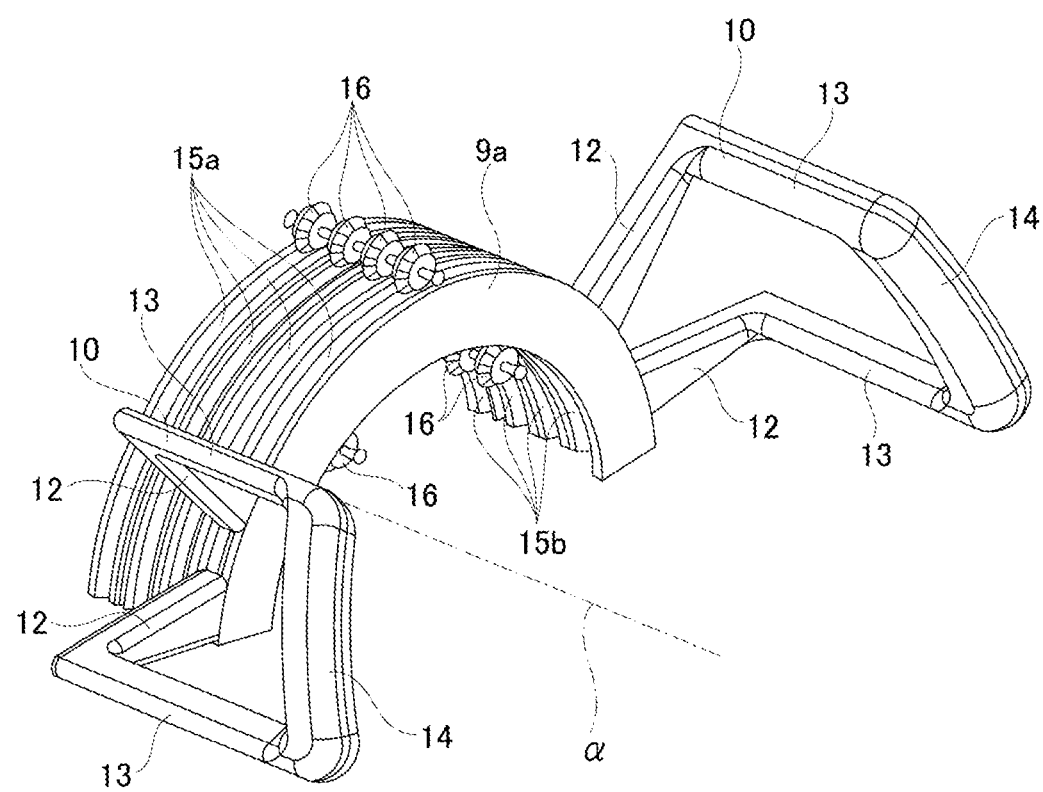
FIG. 11 is a perspective view as seen from above illustrating a handle of a third example of an embodiment of the present invention in a state in which the handle cover is removed.
Figure 12:
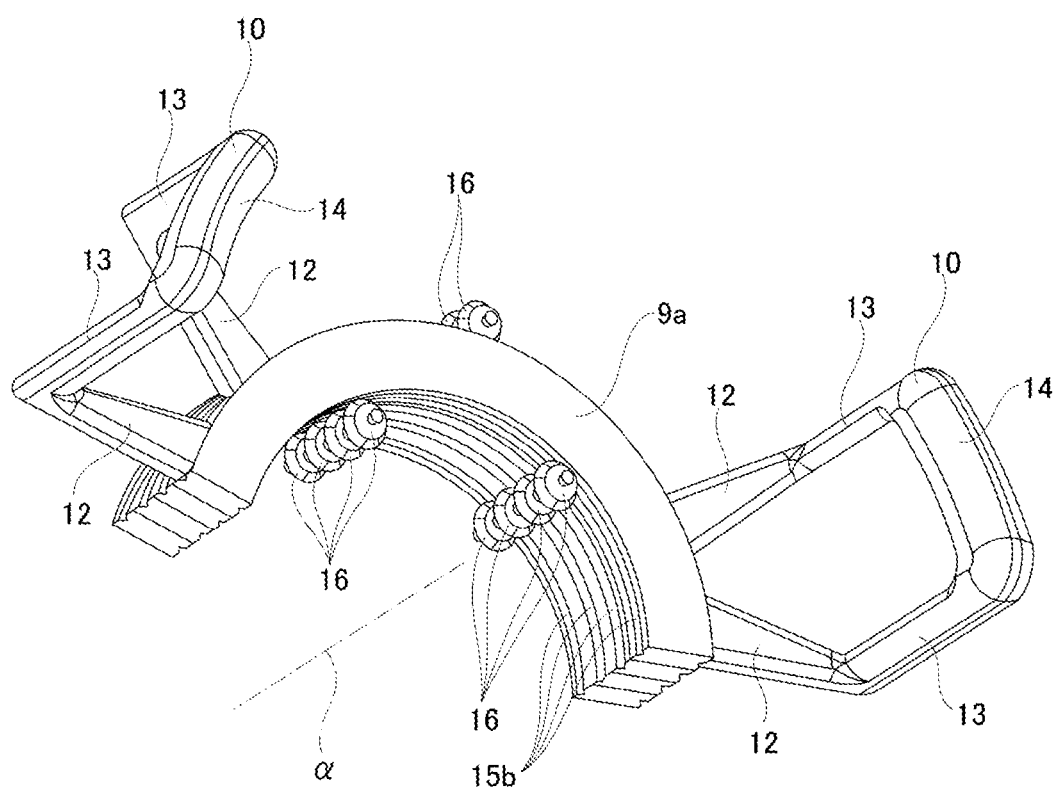
FIG. 12 is a perspective view as seen from below illustrating the handle of the third example in a state in which the handle cover is removed.

A third example of an embodiment of the present invention will be described using FIGS. 11 and 12. In this example, the rollers 16 arranged on the outer-diameter side of the rotating-side guide 9a and the rollers 16 arranged on the inner-diameter side of the rotating-side guide 9a are provided at a plurality of locations (four locations in the illustrated example) in the direction of the center axis of rotation α of the handle. Each of these rollers 16 is engaged with the circumferential grooves 15a, 15b formed on the outer-circumferential surface and the inner-circumferential surface of the rotating-side guide 9a. In other words, in this example, the circumferential grooves 15a, 15b are formed at a plurality of locations in the axial direction (four locations in the illustrated example) on the outer-circumferential surface and the inner-circumferential surface of the rotating-side guide 9a. The rollers 16 engage with each of these circumferential grooves 15a, 15b.

In this example, the phase of the arrangement in the circumferential direction of the rollers 16 arranged on the outer-diameter side of the rotating-side guide 9a and the phase of the arrangement in the circumferential direction of the rollers 16 arranged on the inner-diameter side of the rotating-side guide 9a are the same as the case of the first example. Therefore, in this example, the rollers 16 arranged on the outer-diameter side of the rotating-side guide 9a and the rollers 16 arranged on the inner-diameter side of the rotating-side guide 9a are arranged at the same positions in the circumferential direction as in the first example and at a plurality of locations side-by-side in rows in the direction of the center axis of rotation α of the handle. However, in a case of implementing the present invention, the rollers provided at a plurality of locations in the direction of the center axis of rotation α of the handle do not necessarily have to be arranged side-by-side in rows in the direction of the center axis of rotation α of the handle as in this example. In other words, the rollers provided at the plurality of locations in the direction of the center axis of rotation α of the handle may be arranged at arbitrary positions in the circumferential direction.

In this example, the plurality of circumferential grooves 15a formed on the outer-circumferential surface of the rotating-side guide 9a and the plurality of circumferential grooves 15b formed on the inner-circumferential surface of the rotating-side guide 9a are arranged so as to be evenly spaced in the direction of the center axis of rotation α of the handle. However, in a case of implementing the present invention, when forming the plurality of circumferential grooves on the circumferential surfaces of the rotating-side guide, these circumferential grooves may be arranged so as not to be evenly spaced in the direction of the center axis of rotation α of the handle.

Figure 13:
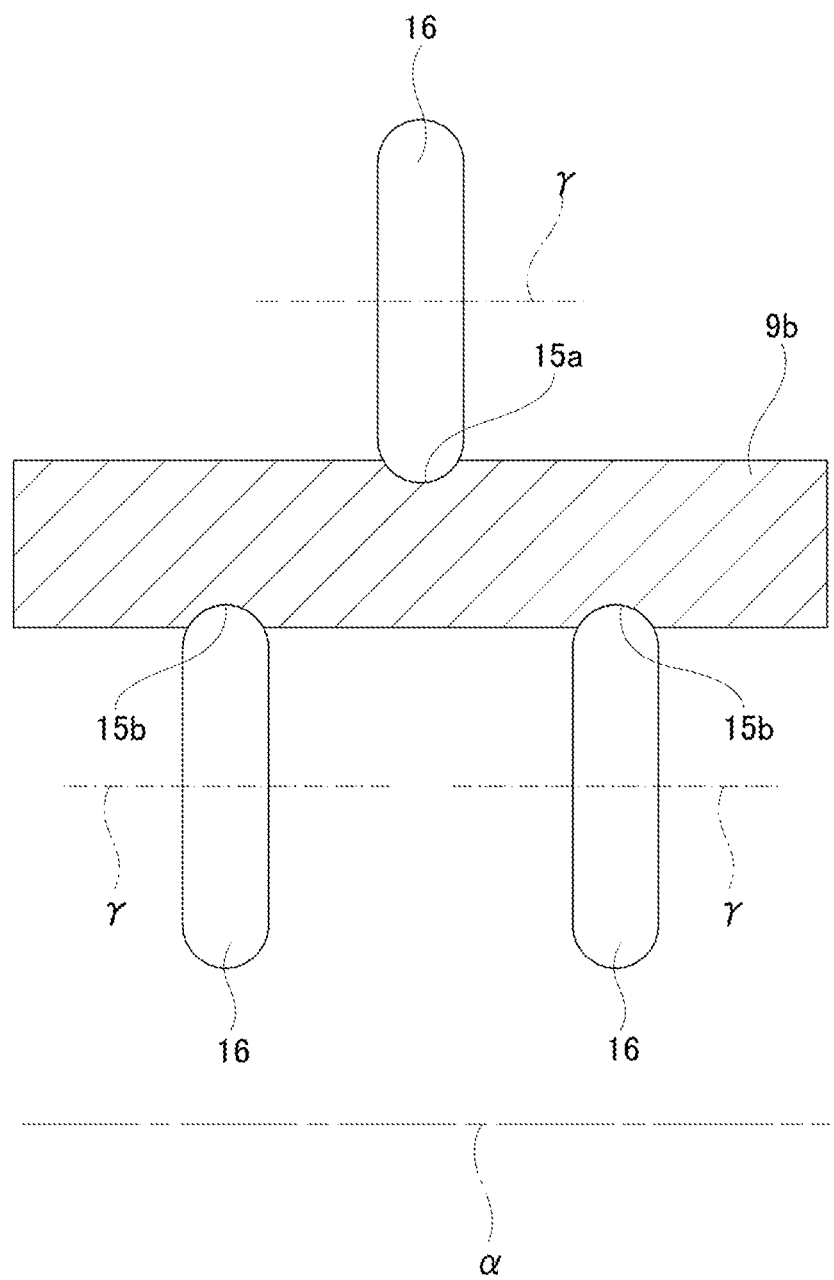
FIG. 13 is a schematic view illustrating a cross-section of a rotating-side guide and rollers of a handle of a first example of a modification of an embodiment of the present invention that is cut by a virtual plane that includes the center axis of rotation of the handle.

In this example, the circumferential grooves 15a formed on the outer-circumferential surface of the rotating-side guide 9a and the circumferential grooves 15b formed on the inner-circumferential surface of the rotating-side guide 9a are arranged such that the phases of the arrangements in the direction of the center axis of rotation α of the handle coincide with each other. However, in a case of implementing the present invention, as illustrated in FIG. 13, for example, the circumferential grooves 15a formed on the outer-circumferential surface of the rotating-side guide 9b and the circumferential grooves 15b formed on the inner-circumferential surface of the rotating-side guide 9b may be such that the phases of the arrangements in the direction of the center axis of rotation α of the handle are different from each other.

In this example, the rollers 16 arranged on the outer-diameter side of the rotating-side guide 9a (9b) and the rollers 16 arranged on the inner-diameter side of the rotat-ing-side guide 9a (9b) are arranged at a plurality of locations in the direction of the center axis of rotation α of the handle. Therefore, the support rigidity (particularly, moment rigidity) of the rotating-side guide 9a (9b) with respect to the fixed-side guide 8 (see FIG. 5) may be increased. Moreover, the rollers 16 provided at a plurality of locations in the direction of the center axis of rotation α of the handle engage with the respective circumferential grooves 15a, 15b formed on the outer-circumferential surface and the inner-circumferential surface of the rotating-side guide 9a (9b). Therefore, the positioning rigidity in the axial direction of the rotating-side guide 9a (9b) with respect to the fixed-side guide 8 may be increased. Other configurations and operations are the same as in the first example.

Figure 14:
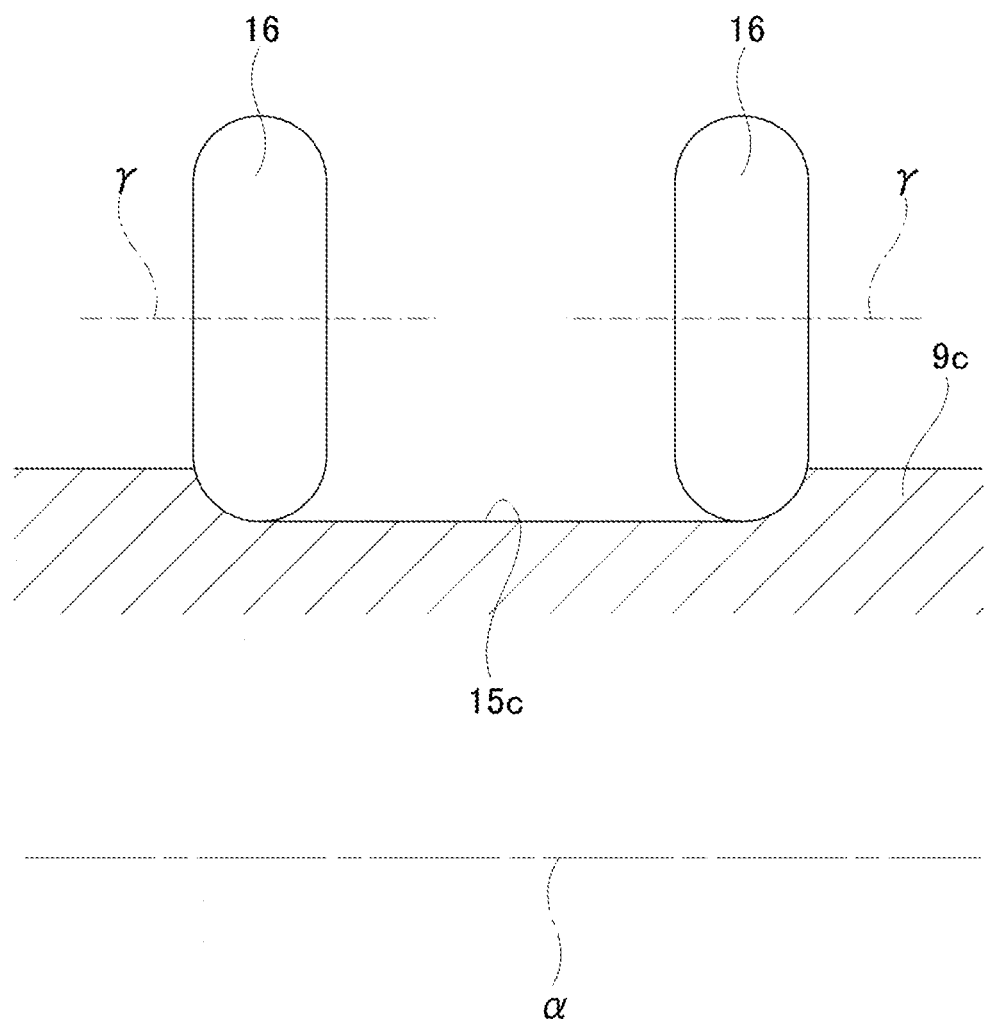
FIG. 14 is a schematic view illustrating a cross-section of a rotating-side guide and rollers of a handle of a second example of a modification of an embodiment of the present invention that is cut by a virtual plane that includes the center axis of rotation of the handle.

In a case of implementing the present invention, when the rollers that are arranged on the outer-diameter side or the inner-diameter side of the rotating-side guide are provided at a plurality of locations in the direction of the center axis of rotation α of the handle, and rollers are engaged with circumferential grooves formed on the circumferential surfaces of the rotating-side guide, for example, as illustrated in FIG. 14, rollers 16 arranged at different locations in the direction of the center axis of rotation α of the handle may also be engaged with a common circumferential groove 15c formed on a circumferential surface of the rotating-side guide 9c.

Figure 15:
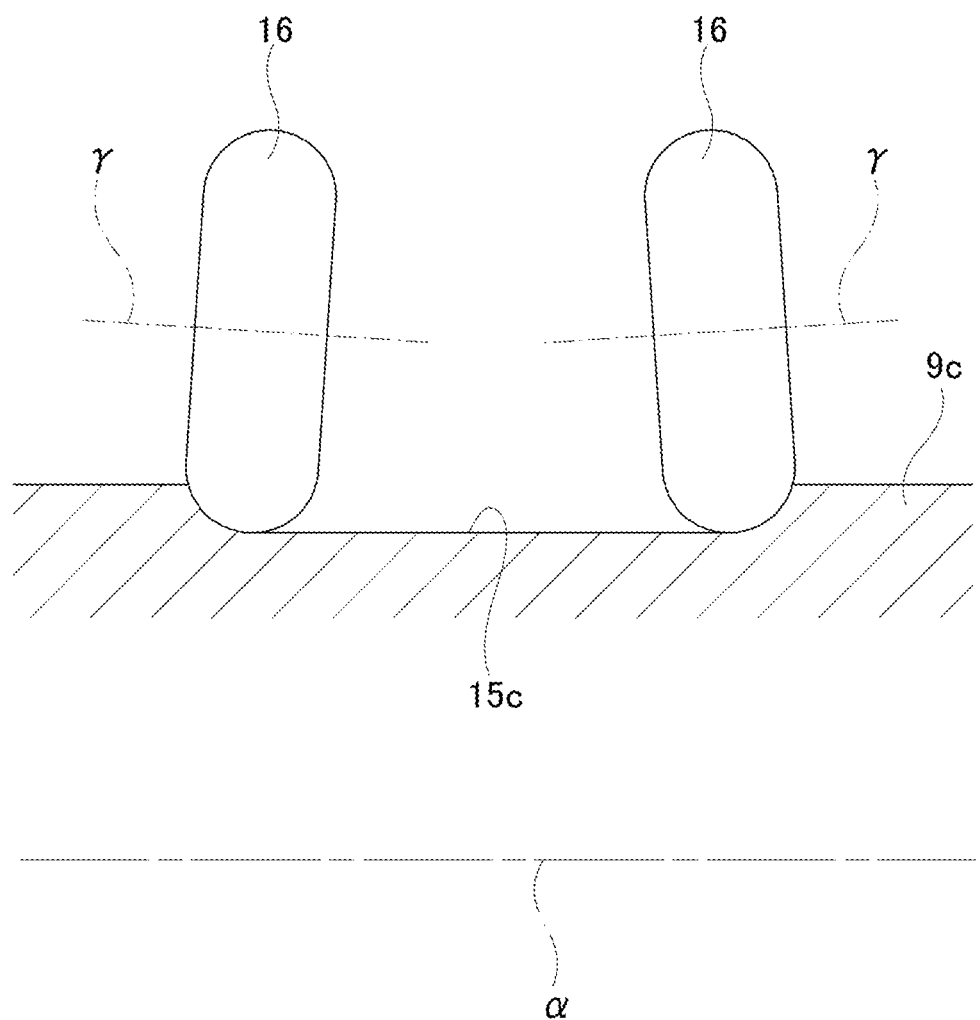
FIG. 15 is a view similar to FIG. 14 illustrating a third example of a modification of an embodiment of the present invention.

In this case, for example, as illustrated in FIG. 15, the center axis of rotation γ of each of the rollers 16 in contact with the inner side surface in the width direction of the circumferential groove 15c can be tilted in a direction toward the circumferential groove 15c while going toward the central side in the width direction of the circumferential groove 15c. In this way, a force that tries to cause the rotating-side guide 9c to displace in the direction of the center axis of rotation α of the handle may be efficiently supported by the rollers 16.

In a case of implementing the present invention, when the rollers arranged on the outer-diameter side or the inner-diameter side of the rotating-side guide are arranged at a plurality of locations in the direction of the center axis of rotation α of the handle, it is also possible to form circumferential grooves for engaging with the rollers in only in a part of the plurality of locations.

Figure 16:
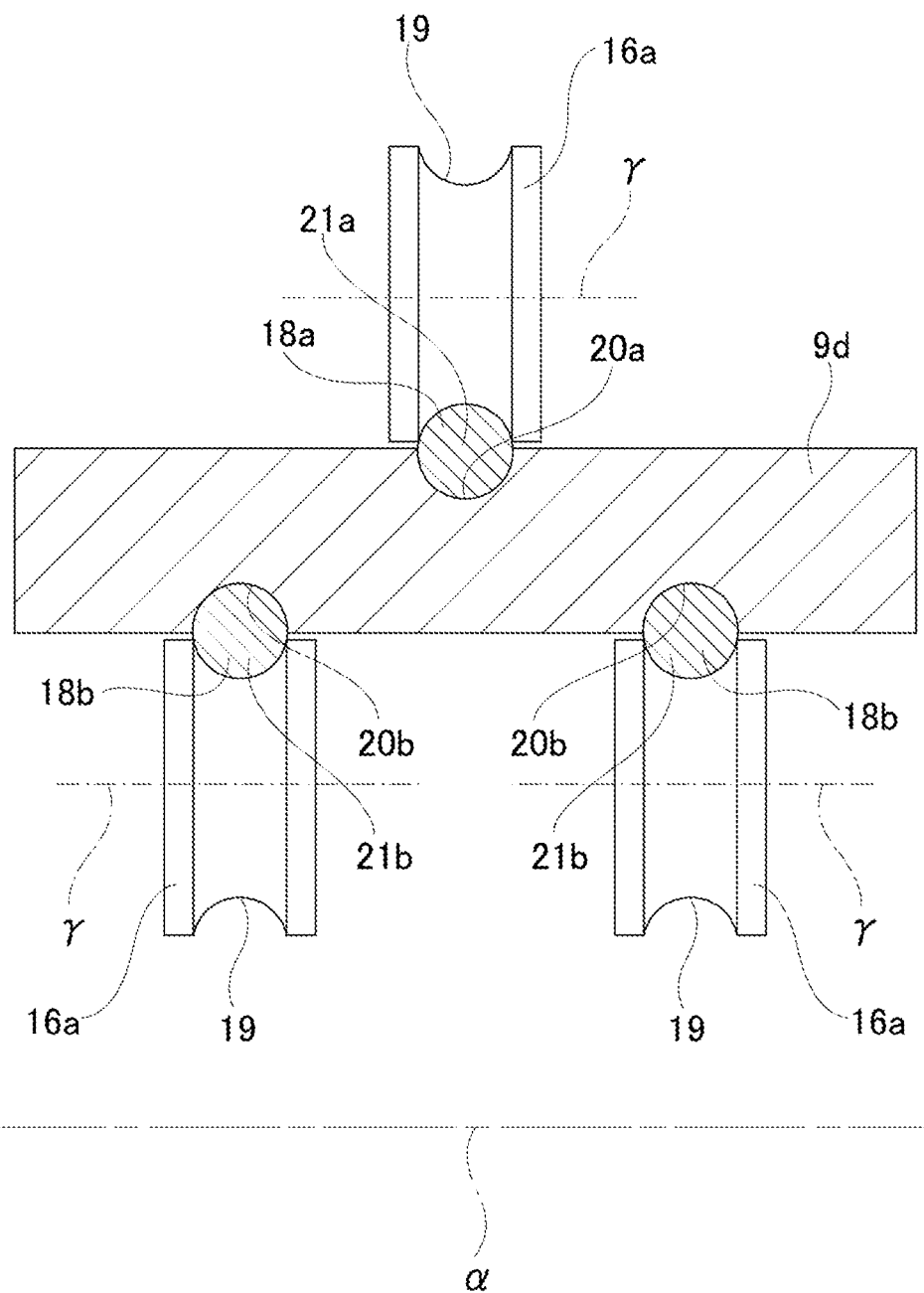
FIG. 16 is a view similar to FIG. 13 illustrating a fourth example of a modification of an embodiment of the present invention.

In a case of implementing the present invention, as a structure for engagement between the circumferential surfaces of the rotating-side guide and the rollers, it is possible, for example, to adopt a structure in which there is engagement between circumferential projections 18a, 18b that are formed in the circumferential direction on the outer-circumferential surface and the inner-circumferential surface of the rotating-side guide 9d and concave grooves 19 formed on the outer-circumferential surface of the rollers 16a such as illustrated in FIG. 16 instead of a structure in which there is engagement between circumferential grooves formed on the circumferential surfaces of the rotating-side guide and the rollers. Moreover, as illustrated in the FIG. 16, the circumferential projections 18a,18b may be formed by separate members such as wires 21a, 21b that are engaged with engaging grooves 20a, 20b formed in the circumferential direction on the outer-circumferential surface and the inner-circumferential surface of the main body portion of the rotating-side guide 9d, or may also be integrally formed with the main body portion of the rotating side guide 9d.

Figure 17:
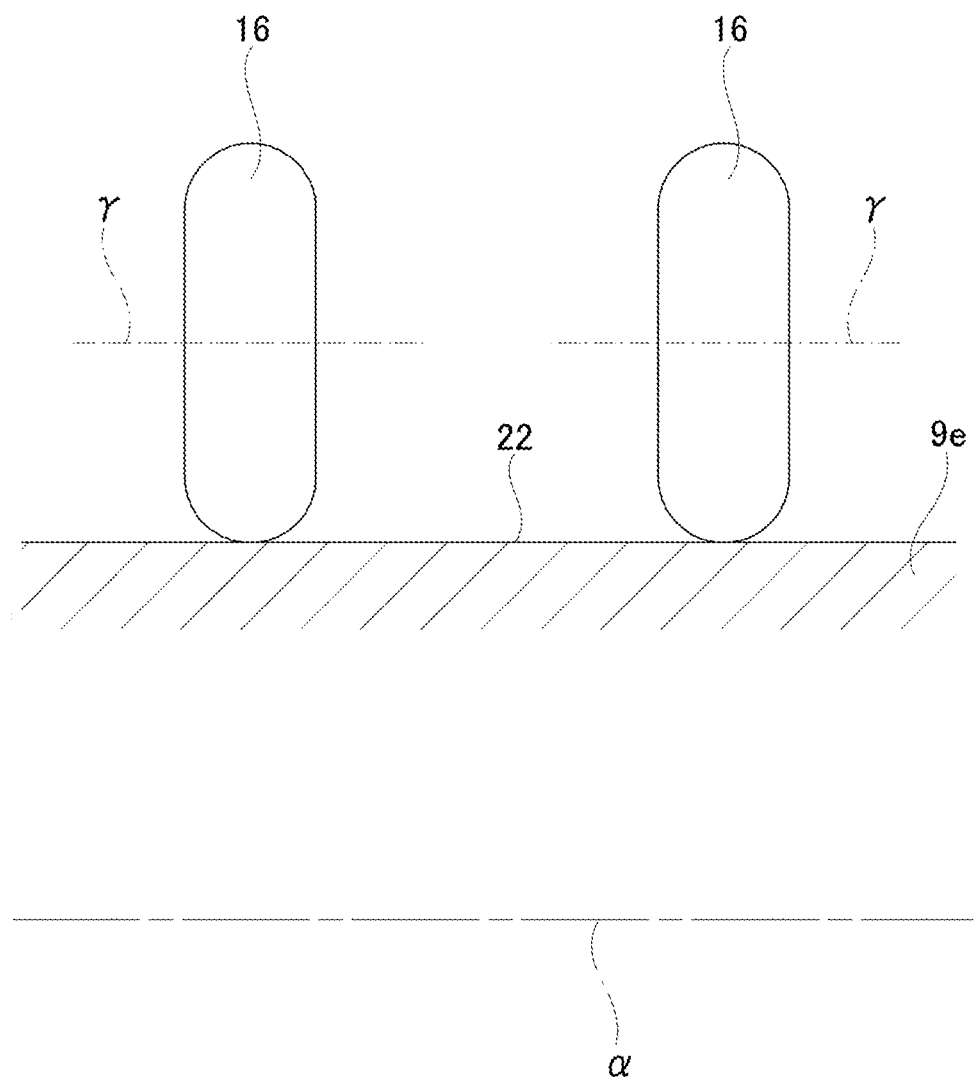
FIG. 17 is a view similar to FIG. 14 illustrating a fifth example of a modification of an embodiment of the present invention.

In a case of implementing the present invention, for example, as illustrated in FIG. 17, it is also possible to adopt a configuration in which at least any of the outer-circumferential surface and the inner-circumferential surface of the rotating-side guide 9e is composed of a simple cylindrical surface 22, and the rollers 16 are brought into rolling contact with the cylindrical surface 22.

The structure of each example of an embodiment of the present invention and the structure of the modifications thereof (FIGS. 1 to 17) may be appropriately combined and implemented as long as there is no contradiction with each other. Furthermore, the steering section of the steer-by-wire system of the present invention may be applied to a structure in which the position adjustment of the handle is manually performed, or may be applied to a structure in which a position adjustment function for adjusting the handle is not provided.

REFERENCE SIGNS LIST 1, 1a Handle
2, 2a Handle-support shaft
3 Housing
4 Front-side shaft portion
5 Rear-side shaft portion
6 Tilt shaft
7 Floor surface
8 Fixed-side guide
9, 9a to 9e Rotating-side guide
10 Grip
11 Handle cover
12 Radial arm portion
13 Axial arm portion
14 Grip portion
15a to 15c Circumferential groove
16, 16a Roller
17 Leg space
18a, 18b Circumferential projection
19 Concave groove
20a, 20b Engaging groove
21a, 21b Wire
22 Cylindrical surface
23 Steered wheels

The invention claimed is:

1. A steering section of a steer-by-wire system, comprising:
a handle-support shaft having a center axis arranged in a direction having a component in a front-rear direction and supported so as not to be able to rotate about the center axis with respect to a vehicle; and
a handle having a center axis of rotation arranged in a direction having a component in the front-rear direction and supported so as to be able to rotate about the center axis of rotation with respect to a rear-end portion of the handle-support shaft;
wherein
the center axis of the handle-support shaft is arranged so as to be offset upward with respect to the center axis of rotation of the handle,
a handle-support shaft portion is supported so as to be able to pivotally displace about a tilt shaft arranged in a width direction of the vehicle, and
the tilt shaft is arranged further forward than the handle-support shaft.

2. The steering section of a steer-by-wire system according to claim 1, wherein
the center axis of rotation of the handle is arranged in a downward direction going toward a front, and a distance between the center axis of the handle-support shaft and the center axis of rotation of the handle in a vertical direction increases going toward the front.

3. The steering section of a steer-by-wire system according to claim 1, wherein
the center axis of rotation of the handle is arranged in a downward direction going toward a front, and the center axis of the handle-support shaft and the center axis of rotation of the handle are parallel to each other.

4. The steering section of a steer-by-wire system according to claim 1, wherein
the handle-support shaft includes a fixed-side guide that is fixed to the rear-end portion of the handle-support shaft, the handle includes a rotating-side guide, and the rotating-side guide is rotatably supported with respect to the fixed-side guide.

5. The steering section of a steer-by-wire system according to claim 4, wherein
the rotating-side guide has a shape extending in a circumferential direction about the center axis of rotation of the handle, and the rotating-side guide is supported so as to be able to freely move in the circumferential direction with respect to the fixed-side guide.

6. The steering section of a steer-by-wire system according to claim 5, further comprising
a plurality of rollers that are rotatably supported with respect to the fixed-side guide and arranged on an outer-diameter side and an inner-diameter side of the rotating-side guide; wherein rolling guidance of the rotating-side guide is performed by the plurality of rollers.

7. The steering section of a steer-by-wire system according to claim 6, wherein
the rollers are arranged at a plurality of positions in a direction of the center axis of rotation of the handle on at least any of the outer-diameter side and the inner-diameter side of the rotating-side guide.

8. The steering section of a steer-by-wire system according to claim 6, wherein
the rotating-side guide is positioned in the direction of the center axis of rotation of the handle with respect to the fixed-side guide by the rotating-side guide and at least one of the plurality of rollers engaging with each other in the direction of the center axis of rotation of the handle.

9. The steering section of a steer-by-wire system according to claim 8, wherein
the rotating-side guide includes a circumferential groove formed in the circumferential direction on a circumferential surface of the rotating-side guide, and the circumferential groove and the at least one roller engage with each other in the direction of the center axis of rotation of the handle.

10. The steering section of a steer-by-wire system according to claim 8, wherein
the rotating-side guide includes a circumferential projection formed on a circumferential surface of the rotating-side guide in the circumferential direction, and the circumferential projection and the at least one roller engage in the direction of the center axis of rotation of the handle.

11. The steering section of a steer-by-wire system according to claim 1, wherein
the tilt shaft is arranged below the center axis of the handle-support shaft.

12. The steering section of a steer-by-wire system according to claim 1, wherein the tilt shaft is arranged at the same position in a vertical direction as the center axis of the handle-support shaft.

* * * * *